(No Model.)
W. WHARTON, Jr.
TRANSFERRING CARS FROM ONE TRACK TO ANOTHER.
No. 282,815. Patented Aug. 7, 1883.
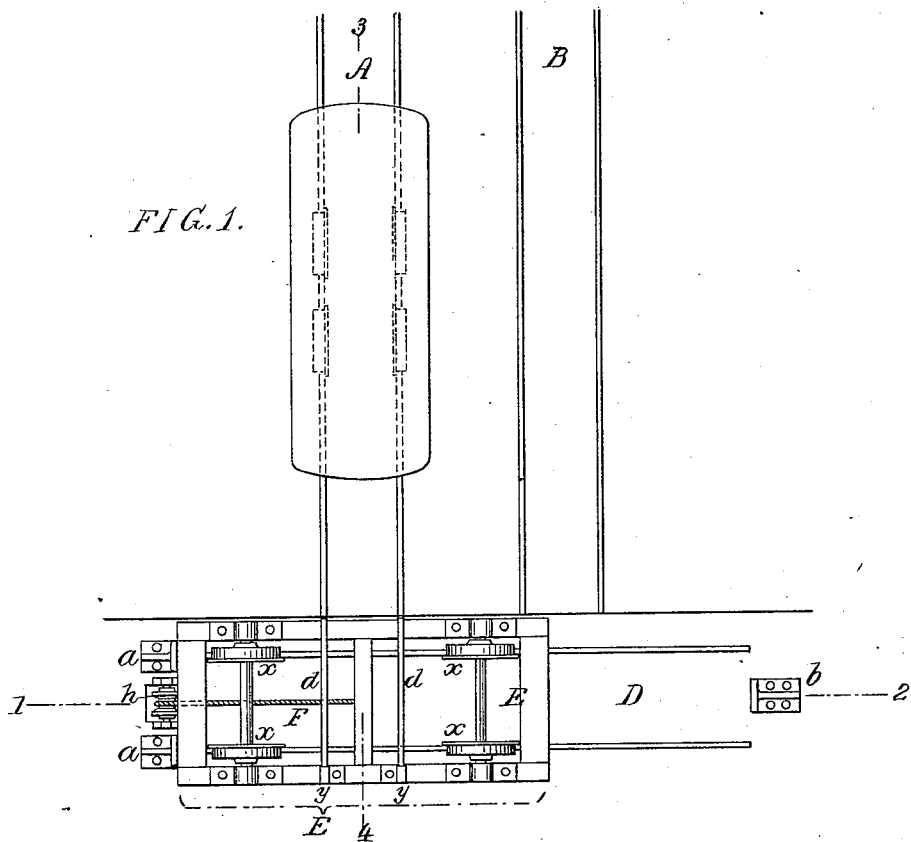
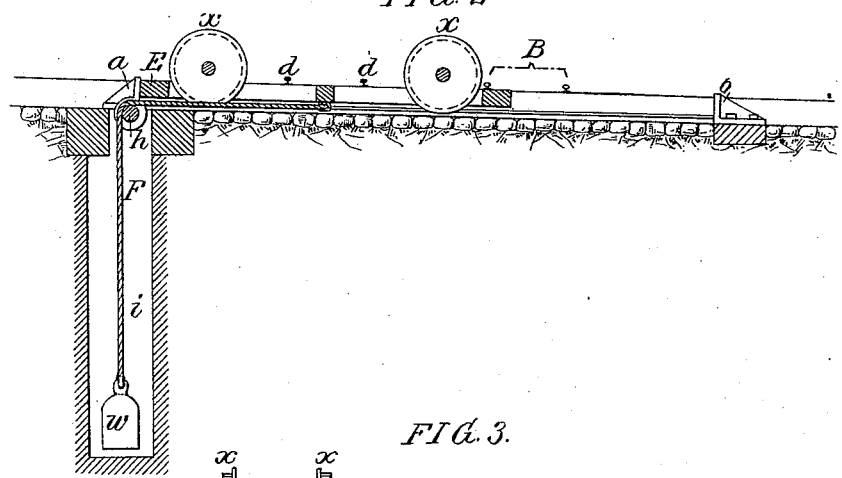
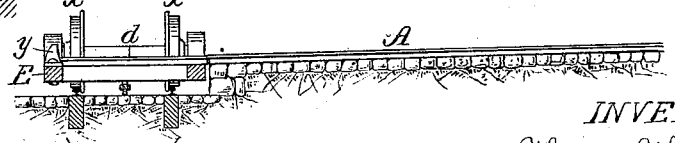
WITNESSES:
David Williams
James F. Tobin
INVENTOR.
William Wharton Jr
by his Att'ys
Howson & Son

UNITED STATES PATENT OFFICE.

WILLIAM WHARTON, JR., OF PHILADELPHIA, PENNSYLVANIA.

TRANSFERRING CARS FROM ONE TRACK TO ANOTHER.

SPECIFICATION forming part of Letters Patent No. 282,815, dated August 7, 1883.

Application filed May 10, 1883. (No model.)

*To all whom it may concern:*

Be it known that I, WILLIAM WHARTON, Jr., a citizen of the United States, and a resident of Philadelphia, Pennsylvania, have invented certain Improvements in Transferring Cars from One Track to Another, of which the following is a specification.

My invention consists of mechanism, fully described hereinafter, whereby a truck on receiving a car from one track will be automatically transferred to a position where the car can be wheeled onto another track, the truck on being relieved of its load returning automatically to its first position, ready to receive another car.

In the accompanying drawings, Figure 1 is a plan view, illustrating my improved mechanism for transferring cars from one track to another; Fig. 2 is a vertical section on the line 1 2, and Fig. 3 a vertical section on the line 3 4.

My invention is illustrated in the present instance as applied to the terminus of a street-railway, of which A is the incoming and B the outgoing track, the latter being lower than the former, as shown in Fig. 2, for a purpose rendered apparent hereinafter.

At right angles, or thereabout, to the tracks A B, but at a lower level than the lowest, is an inclined track, D, to the rails of which are adapted the wheels $x$ of a transfer-truck, E, the movement of which is limited in one direction by the bumper-posts $a$ $a$ and in the opposite direction by the bumper-post $b$; or any other available devices may be used for limiting the movement of the truck. Two rails, $d$ $d$, are secured to the transfer-truck, and when the latter is in contact with the posts $a$ $a$, as shown in the drawings, these truck-rails will coincide with those of the incoming track A; but when the truck is in contact with the post $b$ the said truck-rails will coincide with those of the outgoing track B. A rope or chain, F, is attached at one end to the transfer-truck, passes over a pulley, $h$, and down a pit, $i$, and carries at its lower end a weight, $w$, which maintains the said truck in its most elevated position (shown in Figs. 1 and 2) when unloaded. The weight $w$ is such, however, and the track D is so inclined that when a car has been transferred to the truck its additional weight will cause the same to slowly descend the inclined track D and to raise the weight $w$ until the truck reaches the bumping-post $b$, when the car carried by the transfer-truck may be wheeled to the outgoing track B. As soon as the truck, however, is relieved from the weight of the car it will be restored to its first position by the counter-weight $w$. It will thus be seen that the transfer-truck is automatically moved from the position where it receives a car from the incoming track to a position where the car can be wheeled to the outgoing track, and that as soon as the car has been thus transferred from the truck the latter will be automatically restored to its first position, ready to receive another car from the incoming track.

I prefer to make the track A slightly inclined downward toward the transfer-truck from a point where the horses can be conveniently detached so that the car will pass automatically down the inclination onto the said truck, where it is arrested by a projection or projections, $y$, on the same.

It is not essential that the truck E should be counterweighted in the manner shown and described. The chain or cord F, for instance, may be attached to a heavy truck adapted to a steeply-inclined track; but in most cases the plan shown in Fig. 2 will be adopted.

Although I have described my invention as used at the terminus of a street-railway, there are other localities where it may be adopted with advantage.

I claim as my invention—

1. The combination of two tracks and a transverse inclined track, D, with a transfer-truck constructed to receive a car, and counterweighted to automatically ascend the inclined track when unloaded and to descend the same when loaded, substantially as set forth.

2. The combination of the inclined transverse track D and the counterweighted transfer-truck with the track A, which is downwardly inclined to induce a car to be self-transferring to the truck, substantially as set forth.

In testimony whereof I have signed my name to this specification in the presence of two subscribing witnesses.

WILLIAM WHARTON, JR.

Witnesses:
HARRY L. ASHENFELTER,
HARRY SMITH.